United States Patent [19]

Nakano et al.

[11] 4,045,634

[45] Aug. 30, 1977

[54] GAS INSULATED SWITCH-GEAR APPARATUS

[75] Inventors: Seizo Nakano; Kazuaki Oishi; Takehiro Kikuchi, all of Hitachi; Syoetu Suda, Naka, all of Japan

[73] Assignee: Hitachi, Ltd., Japan

[21] Appl. No.: 648,677

[22] Filed: Jan. 13, 1976

[30] Foreign Application Priority Data

Jan. 16, 1975 Japan .................................. 50-6308

[51] Int. Cl.² .......................................... H01H 33/56
[52] U.S. Cl. ............................ 200/148 B; 200/148 E
[58] Field of Search ............ 200/148 E, 148 B, 148 R

[56] References Cited

U.S. PATENT DOCUMENTS

| 3,614,355 | 10/1971 | Boersma | 200/148 E |
| 3,743,804 | 7/1973 | Frowein | 200/148 B |

*Primary Examiner*—Robert S. Macon
*Attorney, Agent, or Firm*—Craig & Antonelli

[57] ABSTRACT

A gas insulated switch-gear wherein power circuit breakers, disconnecting switches, earthing switches and the like constituting a power electric sub-station are enclosed in earthed metallic vessels and insulation therein is effected by means of insulated arc-suppressing gas is housed in a switching house, a bushing forming a terminal at the electric power line side is provided separately outside of the switching house, and said bushing located outside and gas insulated switch-gear is electrically connected by means of gas insulated bus bar, to thereby eliminate a wall bushing.

7 Claims, 6 Drawing Figures

GAS INSULATED SWITCH-GEAR APPARATUS

BACKGROUND OF THE INVENTION

This invention relates to a gas insulated switch-gear, more particularly it is concerned with improvement of a gas insulated switch-gear apparatus being housed in a switching house.

The voltage of power electric line is being stepped up with the increase in electric power demand, and a power electric line with a voltage ranging from 500 to 800 KV has been realized.

Accordingly, a power electric sub-station or power electric switching station provided on a power electric line with such an ultra-high voltage requires a large installation area. For example, in the case of the line voltage being 500 KV, an insulation distance between the respective three phases or insulation distance from the round amounts to 8 meters including some allowance. Therefore, it is advantageous that the switch-gear used is formed into a gas insulated switch-gear wherein power circuit breakers, disconnecting swtiches, earthing switches and the like provided in a power electric sub-station or power electric switching station are enclosed in earthed metallic vessels and insulation therein is effected by means of SF6 gas with a high dielectric strength and excellent arc-suppressing characteristics.

According to the arrangement of gas insulated switch-gear described above, it is possible to reduce the installation area of the components into about one tenth thereof and render the switching apparatus compact in size. While, the insulation distance between a bus bar and a feeding bus bar, both of which are electrically connected to the switching apparatus, cannot be decreased. Moreover, a multitude of insulators insulatingly supporting the respective bus bars should be large and long on account of securing the insulation distance against the support frame of bus bars.

Furthermore, the respective bus bars are provided outdoors and hence, if the aforesaid station is located adjacent to sea shore, the station is liable to be affected by salty wind and also by sand and dust. For this reason, frequent maintenance services are required and reliability tends to be lowered.

Therefore, it is desirable to install said bus bars, gas insulated switching apparatus and further current transformers, voltage detectors, spark gap devices and the like in the switching house.

When these components are installed in the switching house, a wall bushing should be mounted in the side wall of the switching house in order to connect these components to the power electric line.

In the case of the power electric line of 500 KV class, the length of said wall bushing from its support portion to its terminal portion comes up to about 8 meters at the outdoor side, it comes up to about 6 meters at the indoor side. Accordingly, the weight of it amounts to several tons and hence the side wall of the switching house should be firmly reinforced. Moreover, such bushings are needed at opposite sides of the switching house, whereby the weight comes up to be doubled so that the construction cost is greatly increased. Furthermore, since the wall bushings are projectingly provided within the switching house, the switching house is reduced in its space factor, thereby necessitating the switching house to be constructed large in size. Additionally, said wall bushings are normally formed into oil filled condenser type bushings and hence, when said bushings are horizontally, penetratingly provided through the walls of the switching house, insulation oil feed means should be mounted at a position fairly high over the ground level, thereby causing difficulties in maintenance services.

SUMMARY OF THE INVENTION

An object of the present invention is to provide a gas insulated switch-gear apparatus effectively utilizing the characteristics of a gas insulated switch-gear.

Another object of the present invention is to provide a gas insulated switch-gear apparatus for which a switching house can be rendered compact in size and simplified in construction.

A further object of the present invention is to provide a gas insulated switch-gear apparatus for which a wall bushing can be dispensed with.

A still further object of the present invention is to provide a gas insulated switch-gear apparatus for which the size of terminal bushing to be provided in the switching house can be reduced by half.

According to the present invention, a terminal bushing is separately provided outside of the switching house housing the gas insulated switch-gear, said terminal bushing and terminal of said gas insulated switch-gear at the power electric line side are electrically connected to each by means of a gas insulated bus bar, thereby attaining the objects described above.

The gas insulated bus bar connected said terminal bushing to the gas insulated switch-gear may be constructed such that a bus conductor is penetratingly provided through a earthed metallic outer shell filled with an insulating gas such for example as SF6 gas.

Said gas insulated bus bar may be constructed such that insulating spacers are sealingly provided at opposite ends of said gas insulated bus bar to hermetically house the gas therein, if necessary.

Additionally, the gas insulated bus bar can be led out through the side wall of the switching house to the outdoor side, or can be also led out through a pit provided from the bottom portion of the switching house to the outdoor side.

DESCRIPTION OF THE PREFERRED EMBODIMENT

Figure 1:
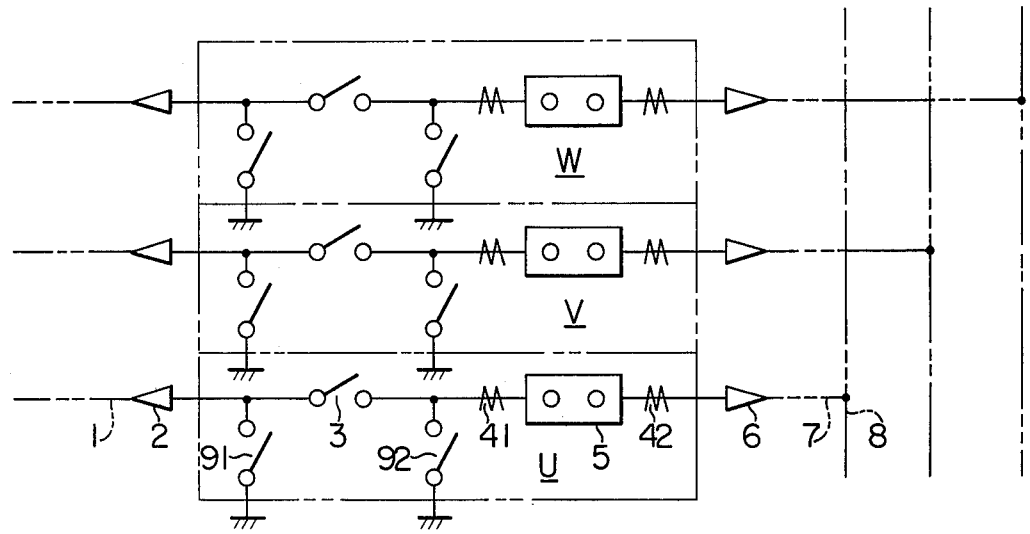
FIG. 1 is a circuit arrangement diagram showing one embodiment of the gas insulated switch-gear apparatus according to the present invention.

FIG. 1 represents a typical circuit arrangement diagram in a power electric sub-station or power switching station.

Although three phase portions U, V and W are shown in the drawing, U phase portion is described on behalf of other because the respective phase portions have the identical construction. A power electric line 1 is connected to a main bus bar 8 through a bushing 2, disconnecting switches 3, current transformers 41, circuit breakers 5, current transformers 42, a bushing 6 and feeding bus bar 7. 91 and 92 denote earthing switches provided at opposite ends of the disconnecting switches 3. Said earthing switches are used to earth for the safety of the inspection work at the time of inspecting of said power electric sub-station or power electric switching station.

Figure 2:
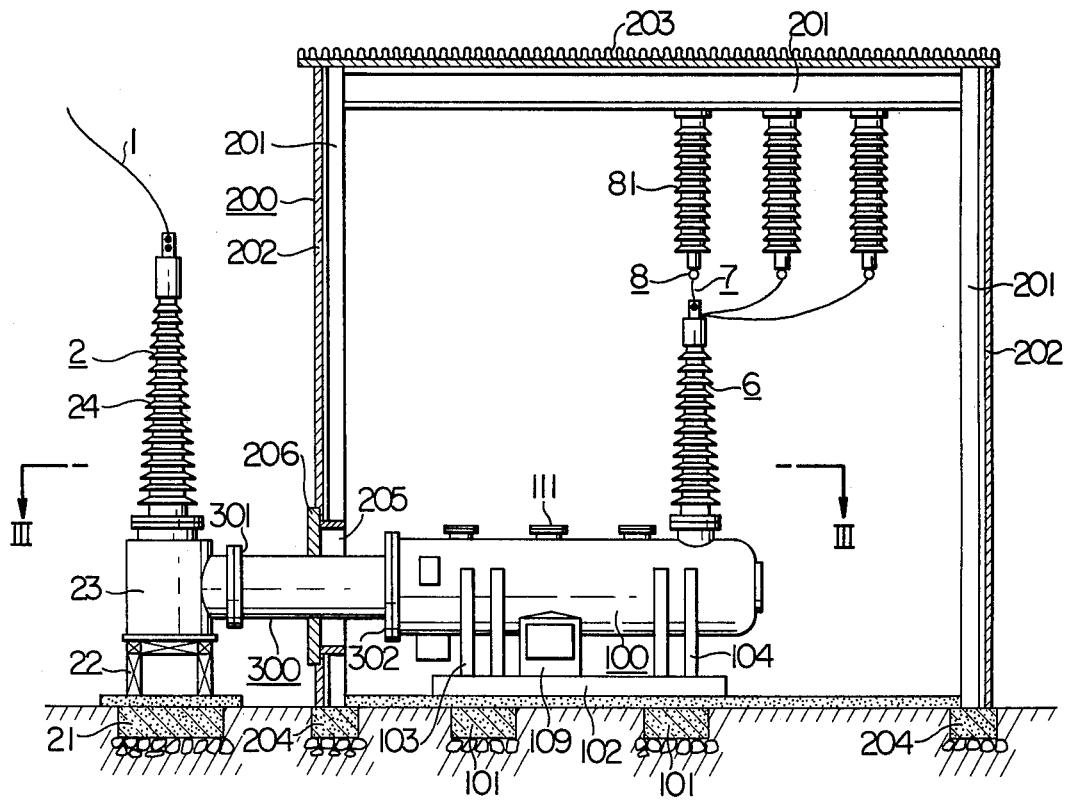
FIG. 2 is a side view showing one embodiment of the gas insulated switch-gear apparatus according to the present invention.
Figure 3:
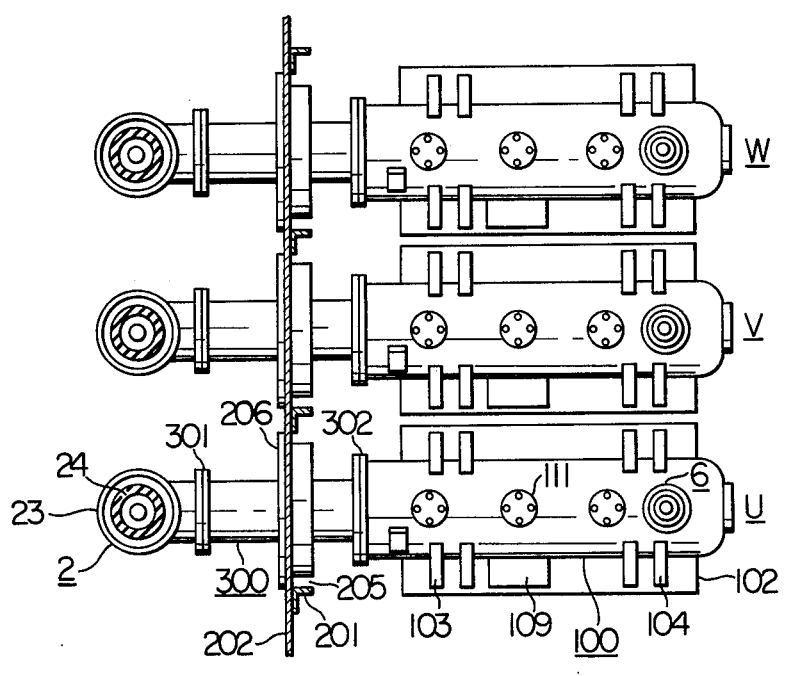
FIG. 3 is a plan view as viewed in the direction of III—III line.

FIGS. 2 and 3 illustrate one embodiment of a specific arrangement of said respective components. A gas insulated switch-gear 100 is constructed such that said disconnecting switches 3, circuit breakers 5, earthing switches 91, 92 and the like are enclosed in earthed metallic vessels and SF6 gas is filled therein under 3 to 10 times of atmospheric pressure.

Said gas insulated switch gear 100 is of indoor type, and is housed in a switching house 200.

The switching house 200 may be of a suitable construction type such as prefabrication or ferro-concrete construction. In this embodiment, a typical prefabrication is illustrated, in which steels 201 such as U-steel, L-steel and I-steel are used to mount outer wall plates 202 and a roof 203 made of corrugated sheets is provided.

Said main bus bar 8 is provided at the ceiling of said switching house 200 by means of a suspension type insulator 81.

Additionally, the switching house 200 is constructed on foundations 204.

The gas insulated switch-gear 100 is mounted on an installation base 102 provided on foundations 101.

A terminal of the gas insulated switch-gear 100 at one side is connected through a bushing 6 to the main bus bar 8 by means of a feeding bus bar 7. Another terminal thereof at the other side is connected through a gas insulated bus bar 300 to a bushing 2 provided outdoors.

Said gas insulated bus bar 300 is penetratingly provided through an opening 205 provided in the side wall of the switching house 200. The dimensions of said opening 205 is made larger than that of the maximum diameters of a connecting flanges 301 and 302, thereby facilitating the work to connect the gas insulated bus bar 300 to the insulated switch-gear 100 or the bushing 2 through said opening 205.

The bushing 2 provided outdoors is mounted on a foundation 21 provided separately of said foundations 204 of the switching house 200.

Installed on the foundation 21 through an installation base 22 is a tank 23 on which a terminal bushing 24 is mounted.

Figure 4:
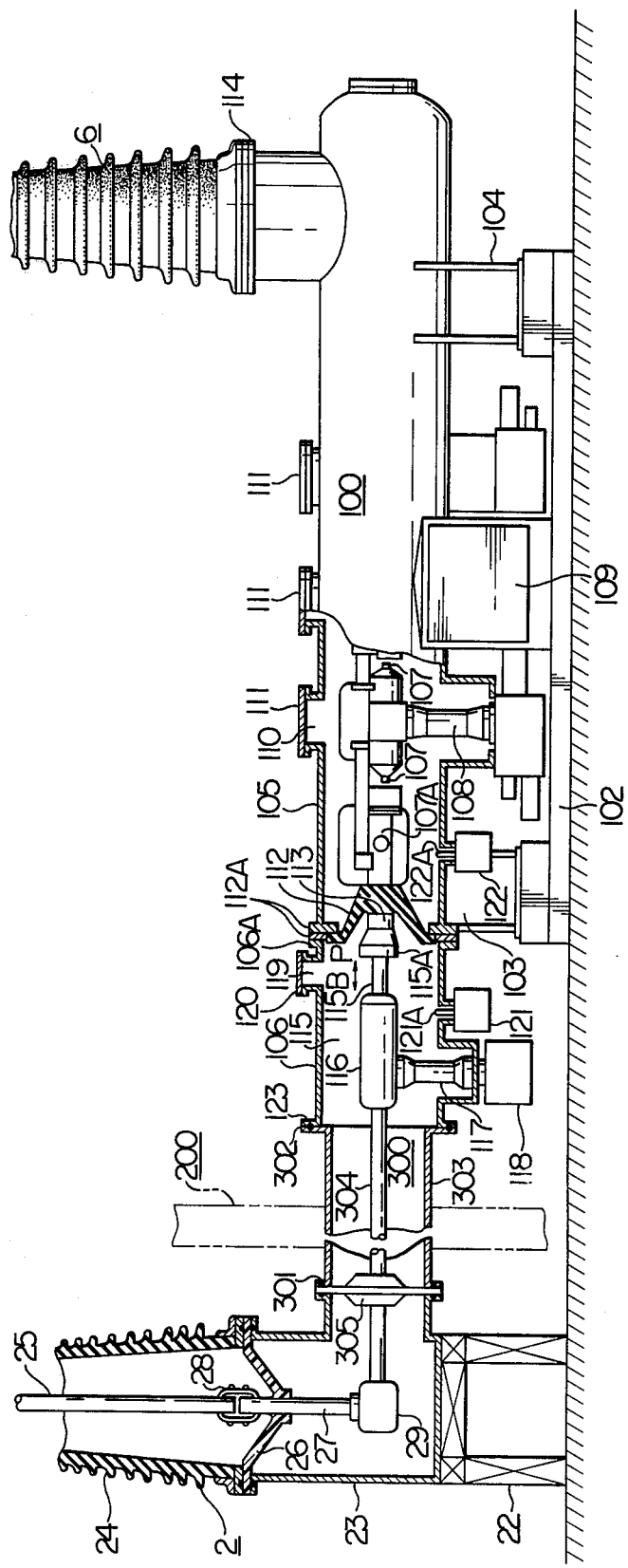
FIG. 4 is a side view of one embodiment of the gas insulated switch-gear apparatus with its portion being shown in longitudinal cross-section.

FIG. 4 detailedly illustrates the constructions of the aforesaid bushings 2, 6, gas insulated switch-gear 100, gas insulated bus bar 300 and the like.

The gas insulated switch-gear 100 is formed within cylindrical metallic vessels 105, 106 supported by the installation base 102 by way of support stays 103, 104. Said metallic vessels are filled with SF6 gas under three to ten times of atmospheric pressure. A plurality of puffer Type gas circuit breaking units 107 in sets of two are arranged in series in the first cylindrical shell 105.

A movable member in a set of circuit breaking units 107 is supported by the vessel 105 through a hollow insulating cylinder 108 and yet is driven and actuated by means of an insulating rod (not shown) penetratingly extending the said insulating cylinder 108.

The reference numeral 109 in an operating mechanism of the circuit breaker provided on the installation base 102. Said operating mechanism and said insulating rod are mechanically associated with each other so as to effect opening or closing operation of the circuit breaker.

The reference numeral 110 represents an opening for inspection which is provided in the vessel 105, and said opening is hermatically sealed by means of a cover 111. Stationary members 107A disposed at opposite ends of the arrangement of circuit breaking units 107 constituting the circuit breaker are insulatingly supported by the vessel 105 through a post type insulator, cylindrical type insulating spacer, disk type insulating spacer or the like. In the embodiment, there is shown a construction where a stationary member 107A located at the left is supported by means of a disk type insulating spacer 112.

Said disk type insulating spacer 112 is hermetically supported at the outer peripheral portion 112A between a flange 105A provided at one end of the vessel 105 and a flange 106A provided at one end of the vessel 106. Additionally, a conductor 113 is penetratingly provided in the central portion of said spacer 112, and is adapted to connect at one end thereof to the circuit breaker and at the other end to disconnecting switches which will be discussed hereinafter, respectively.

Said spacer 112 gastight-compartmentally partitions the vessel 105 from the vessel 106.

The left side of the arrangement of the circuit breaking units 107 is electrically connected to a central portion conductor (not shown) of the bushing 6 mounted on a flange 114 projectingly provided on the vessel 105.

Disconnecting switches 115 are enclosed in said metallic vessel 106. Said disconnecting switch 115 comprises a stationary contact 115A mounted on one end of said conductor 113 and a movable contact 115B disposed in opposite relation to said stationary contact 115A. Said movable contact 115B is in contact with an supported by an electrically conductive member 116 incorporating an electrically collective contact (not shown). Said electrically conductive member 116 is supported by the vessel 106 through a hallow insulating cylinder 117. The movable contact 115B is adapted to be driven and actuated in the direction of an arrow 'P' shown in the drawing by means of the operating mechanism 118 mounted on the outer surface of the vessel 106 through the insulating rod (not shown) expending through said insulating cylinder 117. 119 is an opening provided in the vessel 106 for inspecting of the disconnecting switches 115, and hermetically sealed with a cover 120.

121 and 122 respectively indicate earthing switches. One of these earthing switches, 121, is mounted on the vessel 106, and its earthing blade 121A is disposed in opposite relation to the electrially conductive member 116. The other of these earthing switches, 122, is mounted on the vessel 105, and its earthing blade 122A is disposed on opposite relation to the stationary member 107A of the circuit breaking unit 107.

A gas insulated bus bar 300 comprises a cylindrical metallic vessel 303 and an electrically conductive member 304 provided cocentrically with the vessel 303 therein.

A flange 302 provided at one end of said vessel 303 is hermetically connected to a flange 123 provided on the aforesaid vessel 106. In addition, although the vessel 106 is not gastight-compartmentally partitioned from the vessel 303 in the embodiment shown, a spacer similar to said disk type insulating spacer 112 may be placed between said both flanges 302 and 123 to form two gastight compartments. In this case, the gas insulated bus bar 300 can be formed into a gas tight unit in cooperation with the disk type insulating spacer 305 provided at the other end of the vessel 303, and can be hermetically sealed at the side of the vessel 106.

In addition, this arrangement is useful in improving insulating performance of the disconnecting switches 115 by increasing the gas pressure in the vessel 106 higher than that in the vessel 303.

the lower end of a central portion conductor 25 extending through the bushing 24 is connected to a connection conductor 27 extending through a disk type spacer 26.

The lower end of the connection conductor 27 is disposed in the tank 23 and connected to an electrically conductive member 29 which is provided with a contact (not shown) to be connected to the electrically conductive member 304 of the gas insulated member 300.

In addition, although the bushing 2 is formed into a gas insulated type bushing in the embodiment described above, according to the present invention an oil filled bushing, particularly an oil filled condenser type bushing can be used in place of said gas insulated type bushing.

When such oil filled bushing is used, the tank 23 is filled with electrically insulating oil. Accordingly, in this case, the spacer 305 may partition between the gas on te side of the gas insulated bus bar 300 and the oil on the side of the tank 23.

Since the side wall of the switching house is penetrated by the gas insulated bus bar 300 and the bushing 2 on the side of the power electric line 1 is connected to the gas insulated switch-gear 100 according to the present invention, the expensive conventional wall bushings can be dispensed with. In addition, in the conventional apparatus, there is provided with a bushing which penetrates the side wall of the switching house 200 and has terminals projecting each side thereof. Thus, the width of the switching house 200 must be large enough to provide a sufficient insulation distance between the end of the inwardly projecting terminal on the switching house 200 and the side wall of this switching house 200. Further, in such the conventional apparatus, there is provided another bushing on the gas insulated switch-gear to connect it with said inwarly projecting terminal of the bushing on the switching house 200, while in the present invention both of such the bushings may be dispensed with. However, according to the present invention, such bushing is not necessary. Additionally, necessity of a large switching house due to the wall bushing projectingly provided in the switching house can be eliminated. Furthermore, it is not necessary to particularly reinforce the construction of the switching house 200 because no wall bushing is provided. Additionally, after the gas insulated bus bar 300 is penetratingly provided through the wall of the switching house 200, the opening 205 is sealed by means of a shield member 206 so that rain, wind and the like can be prevented from intruding into the switching house 200 (Refer to FIG. 2). In addition, when occurrence of distortion is expected between the gas insulated bus bar 300 and the switching house 200 due to possible ground subsidence, it is effective to partially use a flexibility member with the shield member 206.

Figure 5:
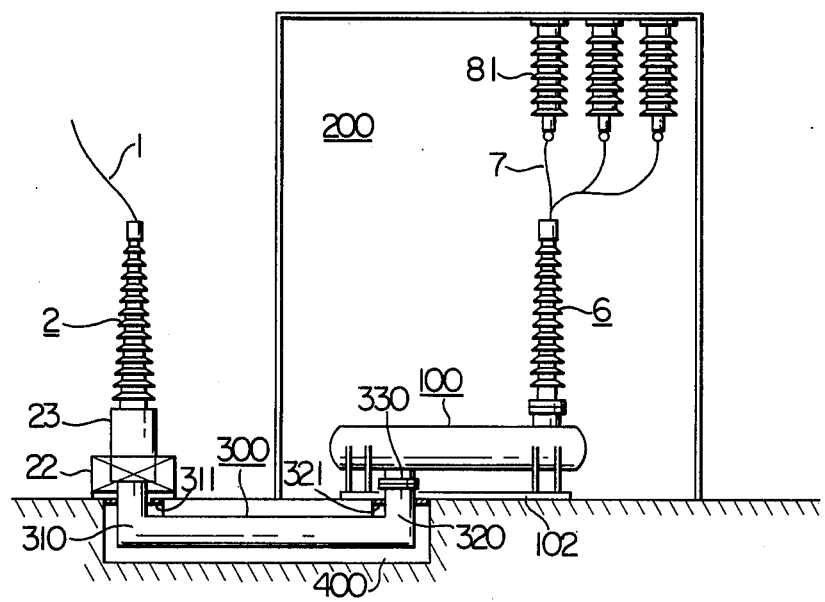
FIGS. 5 and 6 are side views roughly showing another embodiment of the gas insulated switch-gear apparatus according to the present invention, respectively.
Figure 6:
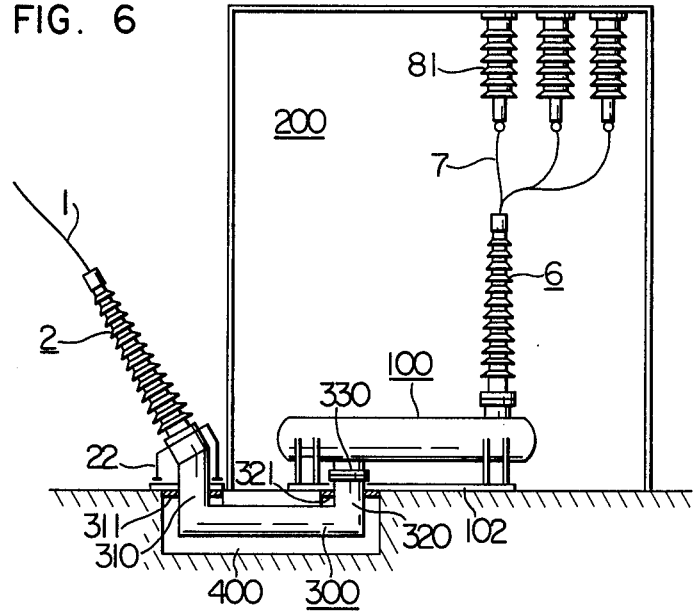

FIGS. 5 and 6 roughly illustrate another embodiment of the present invention, and same reference numerals as in the embodiment shown in FIGS. 2 through 4 are used throughout the Figures to designate same or similar parts.

In the embodiment shown in FIG. 5, a pit 400 extending from the floor surface of the switching house 200 to the outdoor side is formed, and a gas insulated bus bar 300 is provided in said pit 400, which is adapted to be connected to the bushing 2. By this, the need of penetration through the wall or roof of the switching house 200 can be dispensed with. In this embodiment, the opposite end portions 310, 320 of the gas insulated bus bar 300 vertically extending from within the pit 400 are provided with shielding members 311, 321 so that rain and dust can be prevented from intruding into the pit 400.

Additionally, when the gas insulated bus bar 300 is connected to the as insulated switch-gear 100, a connecting portion 330 is provided beneath said gas insulated switch-gear 100 for such connection. Furthermore, connection between said bus bar 300 and the bushing 2 is made from under the tank 23. In the embodiment shown in FIG. 6, the installation base 22 of the bushing 2 is slantingly provided so that the forward end portion of the bushing 2 can be kept away from the switching house 200. Since the insulating distance between the forward end portion of the bushing 2 and the switching house 200 can be extended in the embodiment shown in FIG. 6, the installation base 22 may be located more adjacent to the switching house 200, whereby the dimensions, particularly length of the gas insulated bus bar 300 can be minimized.

In the embodiments described hereinbefore, indications of the current transformers, voltage detector, spark gap device and the like are omitted. However, of course, these components of known constructions should be provided in the switching house. What is claimed is:

1. A gas insulated switch-gear apparatus comprising:
   a gas insulated switch gear including power circuit breakers, disconnecting switches and earthing switches which are enclosed in earthed metallic vessels filled therein with insulating, arc-suppressing gas and electrically, mechanically associated with one another;
   an input terminal and output terminal led out of said gas insulated switch-gear;
   a switching house housing said gas insulated switch-gear;
   a main bus bar insulatingly supported through insulators in said switching house; and
   a connection bus bar connecting said main bus bar to one of the input terminal and the output terminal of said gas insulated switch-gear;
   characterized in that:
      a terminal bushing is provided separately of said switching house outside of the switching house and said terminal bushing is electrically connected to the other terminal of said gas insulated switch-gear by means of a gas insulated bus bar extending through the wall of said switching house.

2. A gas insulated switch-gear apparatus as set forth in claim 1, characterized in that:
   the installation foundation of said switching house and the installation foundation of said terminal bushing are constructed separately of each other.

3. A gas insulated switch-gear apparatus as set forth in claim 1, characterized in that:
a gap formed between the outer shell of the gas insulated bus bar and the circumference of the hole for said gas insulated bus bar, which is penetratingly provided in said switching house, is blocked by flexible seal means.

4. A gas insulated switch-gear apparatus as set forth in claim 2, characterized in that:
the power electric line side terminal of said terminal bushing is slantingly mounted on the base provided on the installation foundation in a manner that said terminal is kept away from said switching house.

5. A gas insulated switch-gear apparatus comprising:
a gas insulated switch-gear including power circuit breakers, disconnecting switches and earthing switches which are enclosed in earthed metallic vessels filled therein with insulating, arc-suppressing gas and electrically, mechanically associated with one another;
an input terminal and output terminal led out of said gas insulated switch-gear;
a switching house housing said gas insulated switch-gear;
a main bus bar insulatingly supported through insulators in said switching house; and
a connection bus bar connecting said main bus bar to one of the input terminal and the output terminal of said gas insulated switch-gear;
characterized in that:
a terminal bushing is provided separately of said switching house outside of the switching house, and said terminal bushing and the other terminal of said gas insulated switch-gear are electrically connected by means of a gas insulated bus bar disposed in a pit extending from the floor surface of said switching house to the outside of said switching house.

6. A gas insulated switch-gear apparatus as set forth in claim 5, characterized in that:
dash-boards are provided between the respective opening portions of said pit and the outer shells of said gas insulated bus bar.

7. A gas insulated switch-gear apparatus comprising:
gas insulated switch-gear each including power circuit breakers, disconnecting switches and earthing switches which are enclosed in earthed metallic vessels filled therein with insulating, arc-suppressing gas and electrically, mechanically associated with one another, and each formed of one of three phases which are provided separately of one another;
input terminals and output terminals led out of the respective phase gas insulated switch-gears;
a switching house housing the respective phase gas insulated switch-gears;
main bus bars of the respective three phases which are insulatingly supported by means of insulators in said switching house; and
connection bus bars each connecting the main bus bar of each phase to one of the input terminal and the output terminal of each phase as insulated switch-gear;
characterized in that:
the respective three phase terminal bushings are provided separately of said switching house outside of the switching house, and said terminal bushings and the other terminals of said gas insulated switch-gears are electrically connected by means of three phase type gas insulated bus bar housing the respective three phase connecting conductors in a common outer shell.

* * * * *